E. A. RYBICKI.
AUTOMATIC GASKET MAKING MACHINE.
APPLICATION FILED FEB. 25, 1920.
1,404,899.
Patented Jan. 31, 1922.
6 SHEETS—SHEET 2.
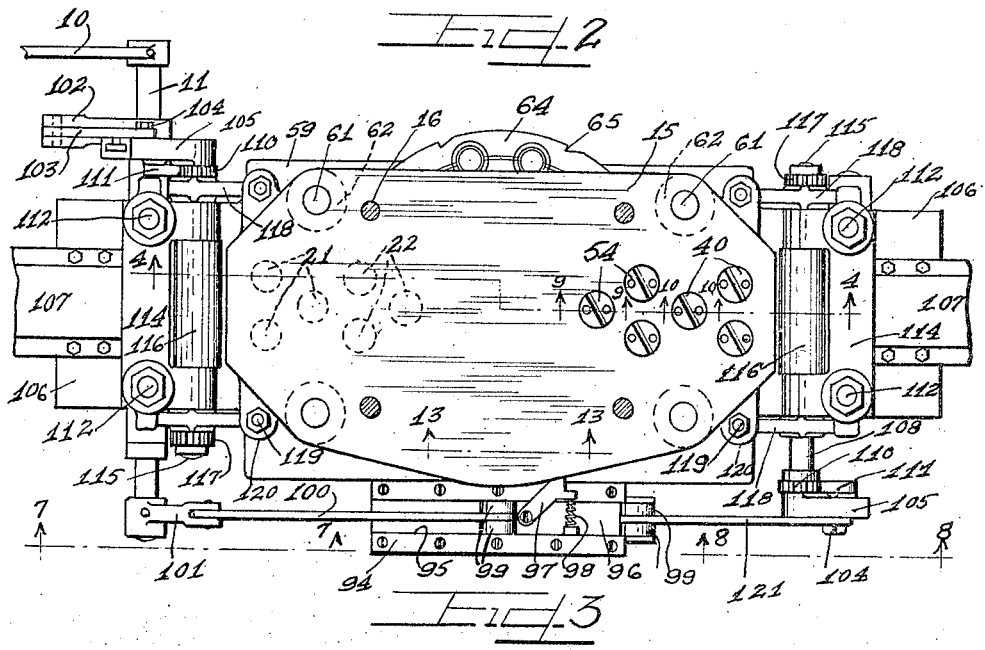
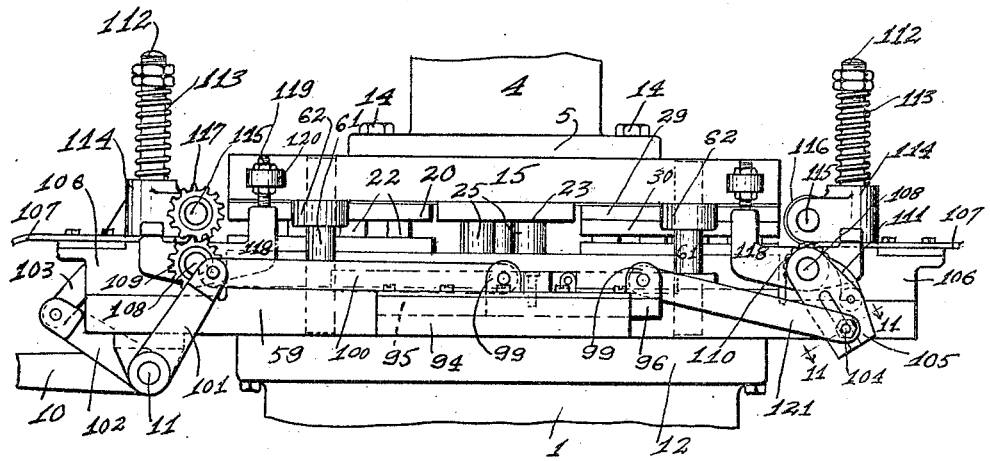
Witnesses
Rudolph T. Berg
Fred E. Paesler
Inventor
Edward A. Rybicki
By Charles W. Mills Atty.

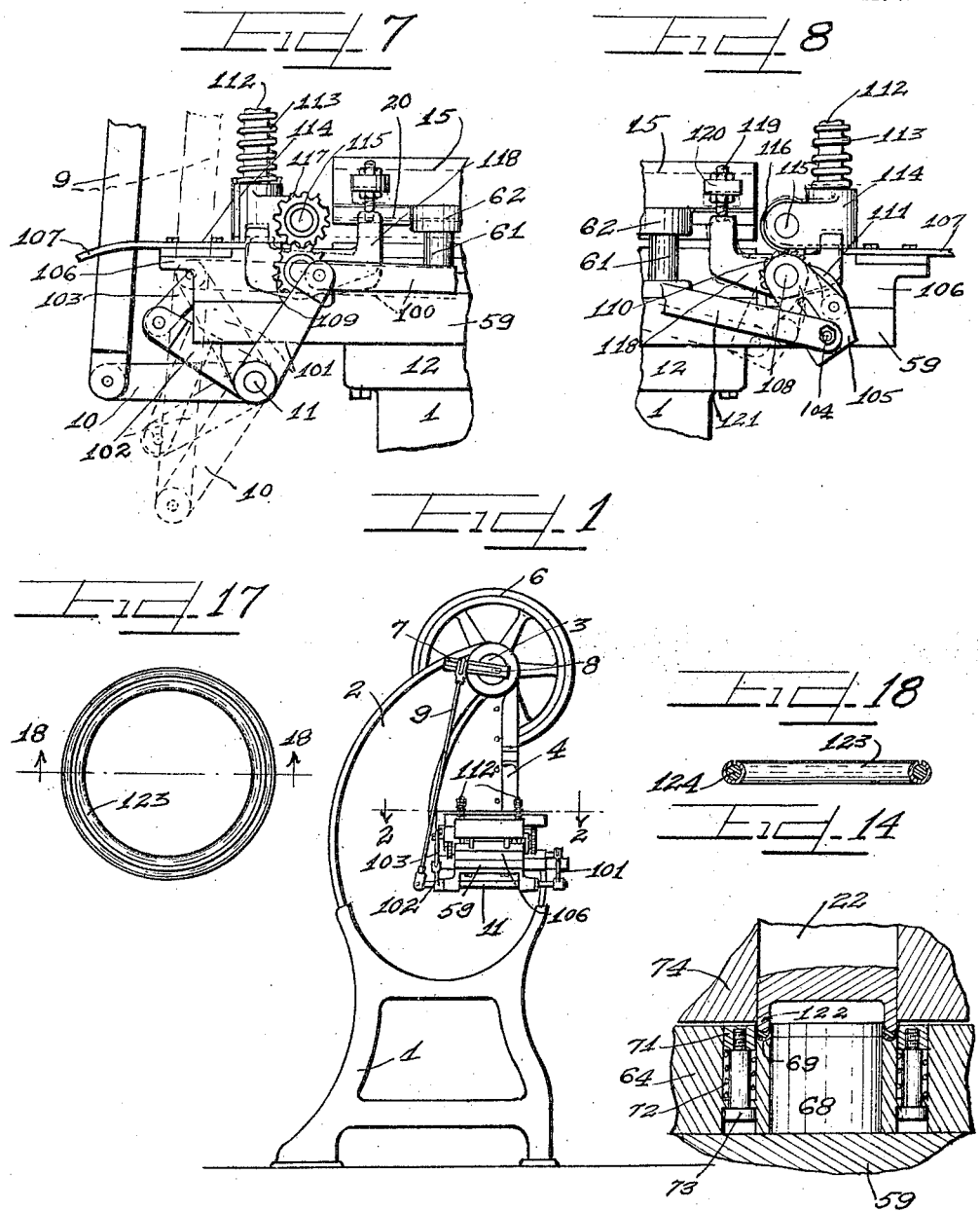

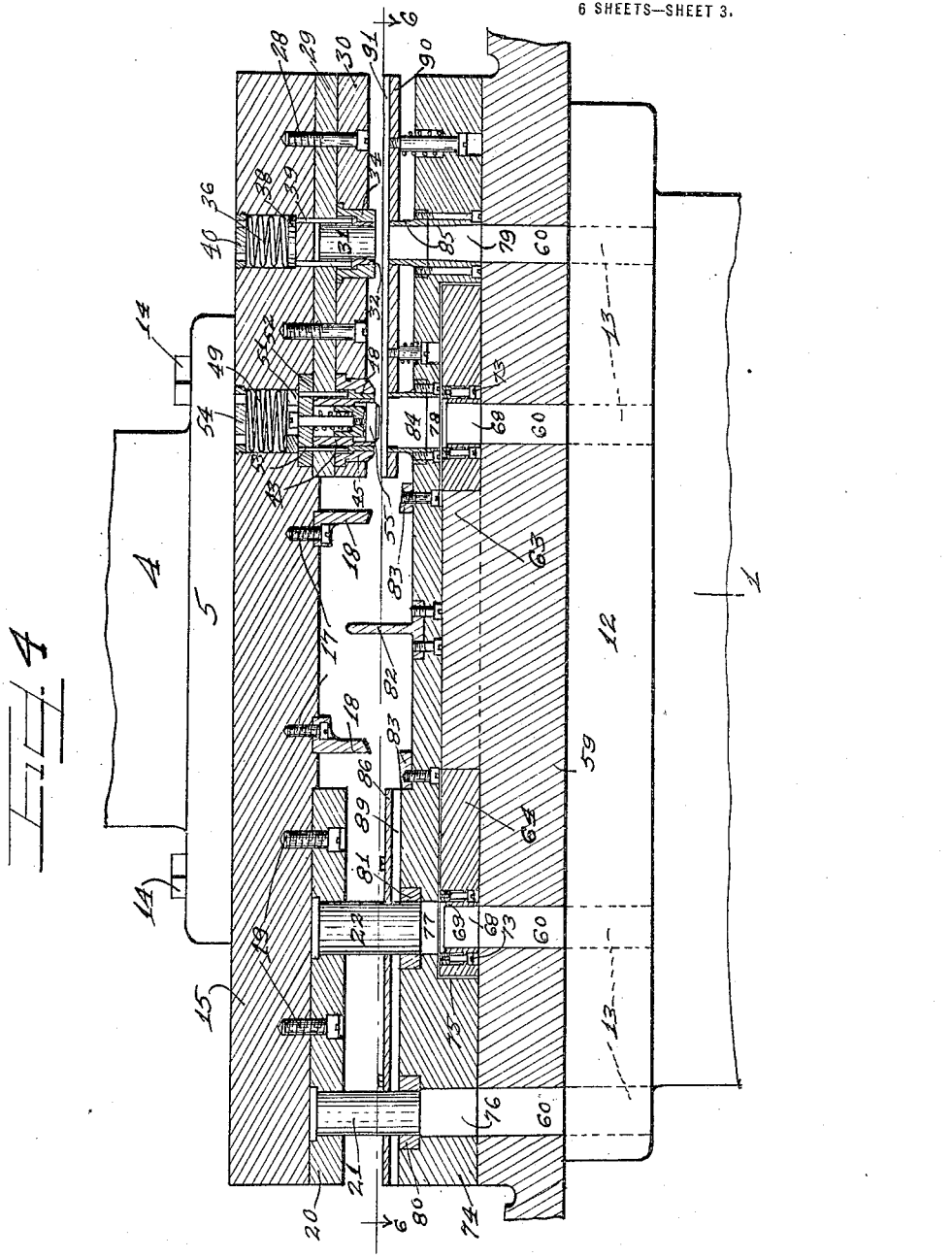

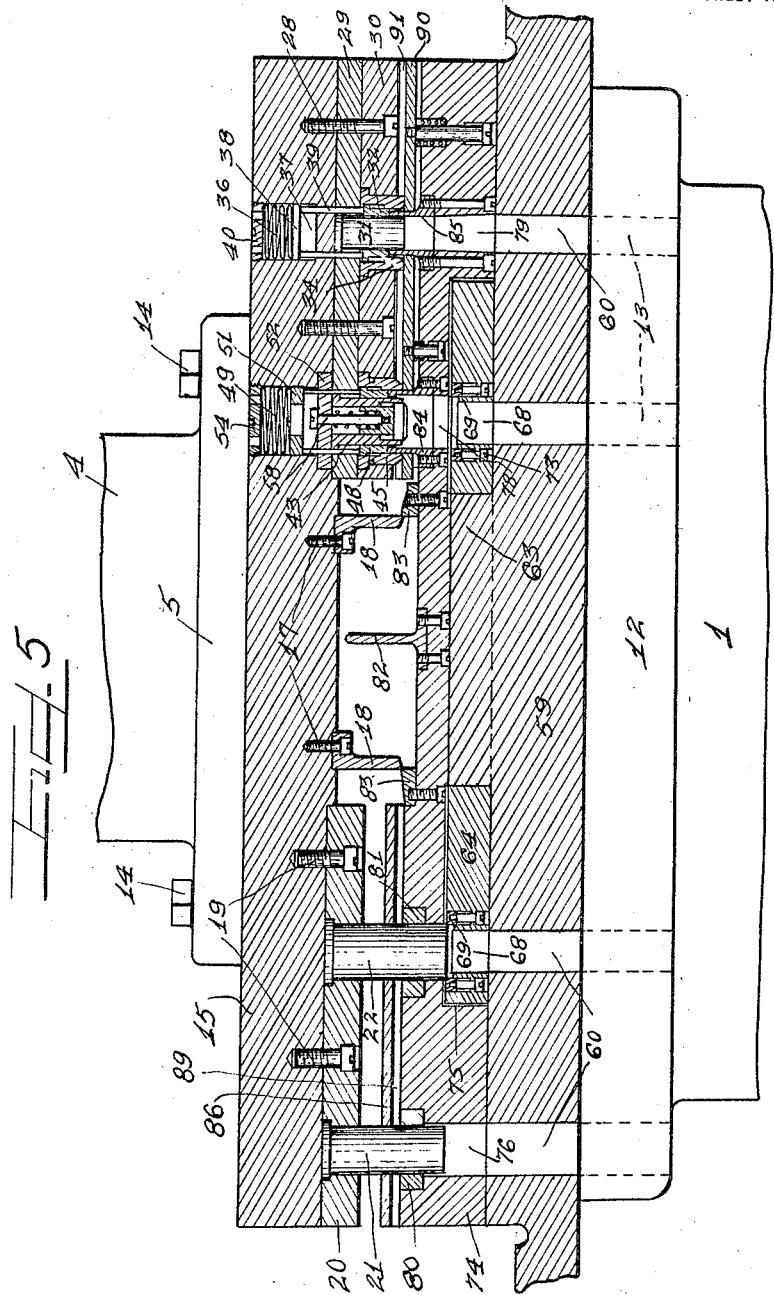

E. A. RYBICKI.
AUTOMATIC GASKET MAKING MACHINE.
APPLICATION FILED FEB. 25, 1920.
1,404,899.
Patented Jan. 31, 1922.
6 SHEETS—SHEET 5.
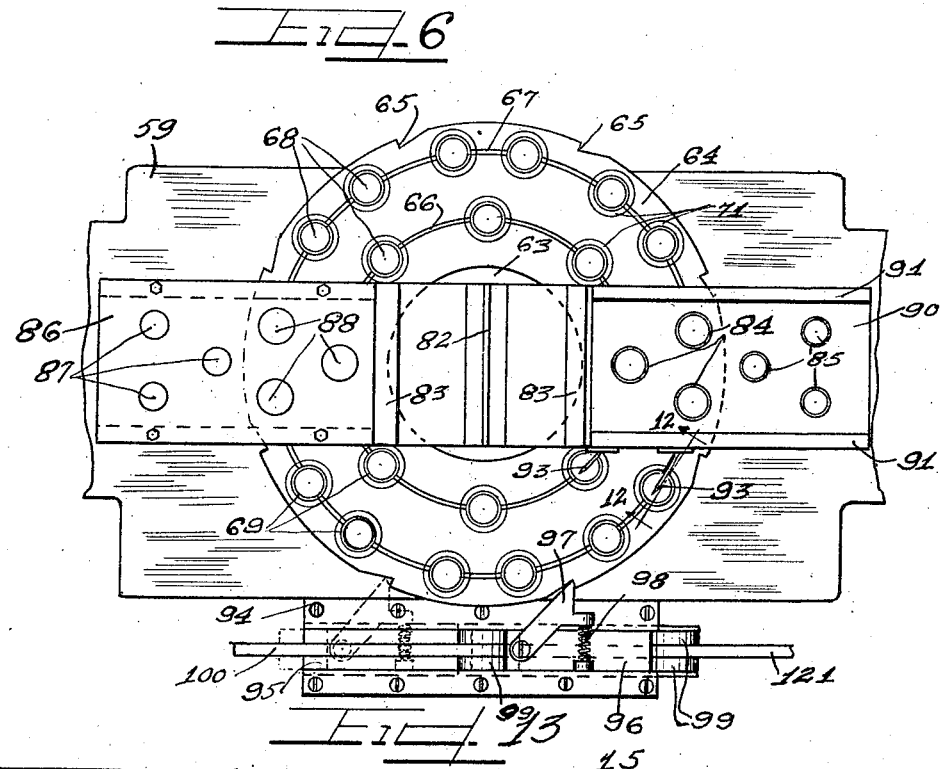
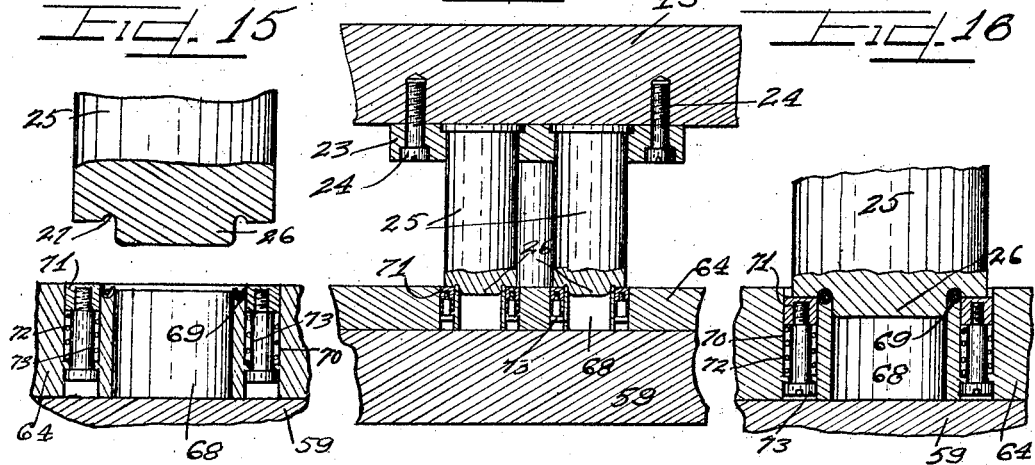
Witnesses
Rudolph T. Berg.
Fred E. Paester.
Inventor
EDWARD A. RYBICKI.
By Charles O. Niles Atty.

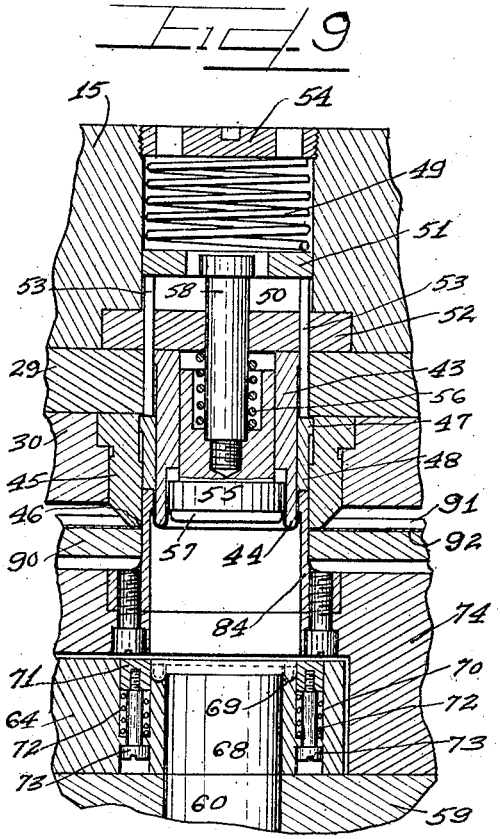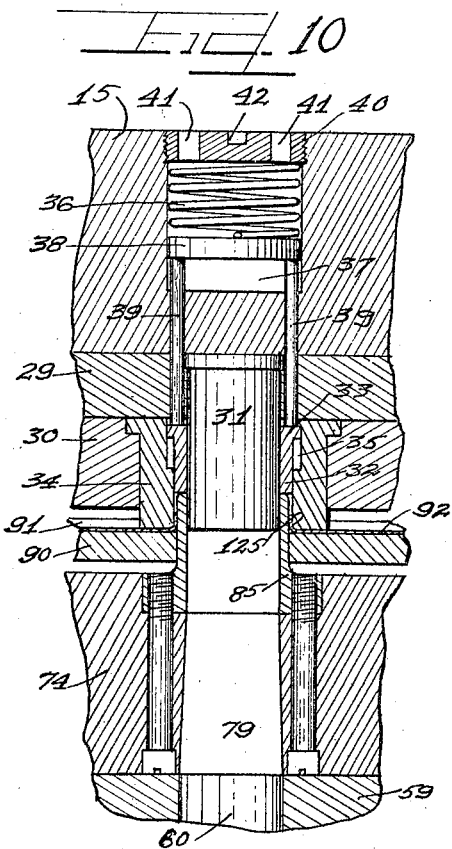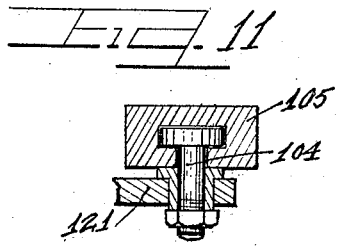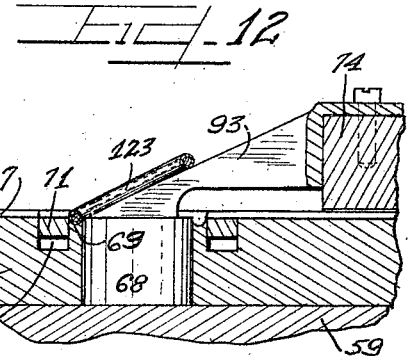

UNITED STATES PATENT OFFICE.

EDWARD A. RYBICKI, OF CHICAGO, ILLINOIS, ASSIGNOR, BY MESNE ASSIGNMENTS, TO UNIVERSAL GASKET & MANUFACTURING CO., A CORPORATION OF ILLINOIS.

AUTOMATIC GASKET-MAKING MACHINE.

1,404,899.  Specification of Letters Patent.  Patented Jan. 31, 1922.

Application filed February 25, 1920. Serial No. 361,228.

*To all whom it may concern:*

Be it known that I, EDWARD A. RYBICKI, a citizen of the United States, and a resident of the city of Chicago, in the county of Cook and State of Illinois, have invented certain new and useful Improvements in an Automatic Gasket-Making Machine; and I do hereby declare that the following is a full, clear, and exact description of the same, reference being had to the accompanying drawings, and to the numerals of reference marked thereon, which form a part of this specification.

This invention relates more particularly to an improved type of automatic machine adapted to make tubular metal ring gaskets having asbestos cores. Said machine is provided with feeding mechanisms adapted to feed a strip of metal and a strip of asbestos inwardly into the machine toward each other to permit punch and die devices to cut and form tubular rings around asbestos cores to form gaskets adapted to be automatically raised and ejected from the machine.

It is an object of this invention to provide an improved type of punch press wherein a ratchet turntable and material feeding mechanisms are adapted to be operated by pawl mechanisms to co-operate with punch devices for the purpose of producing gaskets.

It is also an object of the invention to provide a punch machine wherein formed gaskets are adapted to be automatically removed from a pawl operated ratchet turntable by stripper fingers.

Another object of the invention is to provide a punch machine having a plurality of groups of punches and dies adapted to coact with a material feeding mechanism and with a rotatable turntable for automatically producing metal gaskets provided with asbestos cores.

It is a further object of this invention to provide a punch machine wherein mechanisms are provided for first stamping and partially forming a metal gasket, then carrying the same into a position to be filled with a stamped core ring, and then completing the forming of the metal gasket to enclose said core ring.

It is furthermore an object of the invention to construct a punch machine provided with means for automatically stamping and partly forming a metal ring and then conveying the same by means of a rotatable turntable into a position to receive a stamped core ring seated therein, after which the metal ring is further acted upon to shape the same around the core ring to form a cored gasket adapted to be automatically removed from the turntable to permit discharge from the machine.

It is an important object of this invention to provide a gasket making machine of an improved construction adapted to automatically form cored gaskets from sheet materials automatically fed from opposite directions into punch and die mechanisms by means of pawl and ratchet operated means, said cored gaskets adapted when completed to be carried by a ratchet turntable into co-acting relation with means for automatically removing the gaskets from the machine.

Other and further important objects of this invention will be apparent from the disclosures in the drawings and specification.

The invention (in a preferred form) is illustrated in the drawings and hereinafter more fully described.

On the drawings:

Figure 1 is a side elevation of a gasket making machine embodying the principles of this invention.

Figure 2 is an enlarged top plan view of the gasket forming mechanism, taken on line 2—2, of Figure 1.

Figure 3 is a front elevation thereof.

Figure 4 is an enlarged detail section taken on line 4—4, of Figure 2, showing parts in elevation, and with the punch descended into an intermediate punching position.

Figure 5 is a similar section showing the punch descended into its lowermost position.

Figure 6 is a top plan view of the die portion of the machine, taken on line 6—6, of Figure 4.

Figure 7 is a fragmentary elevational view taken on line 7—7, of Figure 2.

Figure 8 is a fragmentary elevational view taken on line 8—8, of Figure 2.

Figure 9 is an enlarged fragmentary detail section taken on line 9—9, of Figure 2.

Figure 10 is an enlarged fragmentary detail section taken on line 10—10, of Figure 2.

Figure 11 is an enlarged detail section taken on line 11—11, of Figure 3.

Figure 12 is an enlarged fragmentary detail section of the gasket ejecting mechanism, taken on line 12—12, of Figure 6.

Figure 13 is an enlarged section partly in elevation and taken on line 13—13, of Figure 2.

Figure 14 is a fragmentary detail section showing a punch forcing a cut asbestos core ring into a partly formed metal gasket.

Figure 15 is a fragmentary detail section partly in elevation and showing a finishing punch in an elevated position above a partly formed gasket having a core ring seated therein.

Figure 16 is a similar view but showing the finishing punch descended to its lowermost position for closing the gasket ring around the core.

Figure 17 is a top plan view of a finished gasket.

Figure 18 is a section thereof taken on line 18—18, of Figure 17.

As shown on the drawings:

The reference numeral 1, indicates a punch machine frame, having secured thereon an upwardly directed curved yoke arm 2, which rotatably supports a crank shaft 3. Connected to a crank pin of the crank shaft 3, is the upper end of an upright punch shaft or ram 4, the lower end of which is provided with an integral apertured flange 5. Engaged on one projecting end of the crank shaft 3, is a fly-wheel 6, adapted to receive a belt therearound for driving the machine. Secured to the other projecting end of the machine crank shaft 3, is a crank arm 7, provided with a longitudinal T-slot 8, for slidably receiving one end of a connecting rod or operating bar 9. The lower end of the connecting rod 9, is pivotally connected with one end of a connecting lever 10, the other end of which is secured on one end of a transverse operating shaft 11. The top of the machine frame 1, is formed to afford a table top 12, provided with a plurality of discharge openings or passages 13, affording outlets for waste material.

The gasket forming mechanisms broadly comprise a punch mechanism supported by bolts 14, on the flange 5, and a die mechanism supported on the frame top 12. The punch mechanism embraces a block or plate 15, provided with threaded openings 16, for receiving the mounting bolts 14. Rigidly secured by screws 17, in transverse grooves formed in the bottom surface of the punch plate 15, are a pair of parallel transverse cutters or blades 18, disposed on opposite sides of the center of the punch plate. Rigidly secured by screws 19, to the bottom and at one end of the punch plate 15, is a punch retainer plate 20, provided with suitable openings through which project a set of three downwardly extending hole or primary cylindrical punches 21, and a set of three downwardly extending ring or secondary punches 22, of a diameter greater than the diameter of said primary punches. Each punch 22, is hollowed out at its lower end to afford a rim 122. The punches 21 and 22, are provided with enlarged integral heads which bear against the bottom surface of the main punch plate 15, as shown in Figures 4 and 5. Rigidly secured on the bottom of the front central portion of the punch plate 15, by means of a retaining plate 23 and screws 24, are three finishing punches 25. The lower end of each finishing punch 25, is provided with an integral axial boss or cylindrical tip 26, surrounded by a circular finishing groove 27, where the tip 26, joins the punch 25.

As shown in Figures 4, 9 and 10, the punch plate 15, is equipped with punch and shaping mechanisms for punching and partly shaping metal gasket rings. For the above purpose two sets or groups of metal gasket punch mechanisms are provided at that end of the punch plate 15, which is opposite the asbestos punches 21 and 22. Rigidly secured to the bottom of the punch plate 15, by screws 28, are two plates 29 and 30, positioned with the plate 29, between the plates 15 and 30. The outer or primary set of metal punch mechanisms consists of three units, each unit, as shown in Figure 10, comprising a cylindrical punch 31, the upper head end of which is secured in the intermediate plate 29. The punch 31, projects downwardly through an adjustable sleeve 32, having an integral guide flange 33. The sleeve 32, is slidable in a flanged collar or sleeve 34, which is rigidly secured in the lower plate 30, and projects downwardly therebelow. The stationary sleeve 34, is provided with a groove 35, for receiving the flange 33, of the slidable sleeve 32. The lower end of the punch 31, is on a level with the lower end of the stationary sleeve 34. Normally the slidable sleeve 32, is held in its lowermost position as shown in Figure 4, with the lower end thereof flush with the lower end of the stationary projecting sleeve 34. The sleeve 32, is held in its lower position by means of a coiled spring 36, which is seated within a chamber 37, provided in the plate 15. The lower end of the spring 36, seats upon a disk or plate 38, which is slidably mounted within the chamber 37. Secured to the bottom of the disk 38, are a plurality of vertical rods or guide stems 39, which slidably project through registering passages provided in the plates 15 and 29. The lower ends of the stems 39, seat against the flange 33 of the slidable sleeve 32. The upper end of the coiled spring 36, is seated against a plug 40, which is threaded into the upper threaded end of the chamber 37, to close said chamber. The plug 40, is provided with openings 41 and a screw slot 42.

The inner or secondary set of metal punch mechanisms also consists of three units. Each unit, as clearly shown in Figure 9, comprises a shaper sleeve 43, secured in the plate 29, and projecting downwardly through the plate 30. The lower projecting end of the sleeve 43, is rounded and of reduced thickness to form a circular shaping edge 44. Rigidly secured in the plate 30, is a flanged sleeve or collar 45, the lower beveled end of which projects below the bottom surface of said plate 30, and is provided with an inner cutting edge 46, positioned on a level with the forming edge 44. The sleeve 45, is provided with a groove for receiving the flange 47, of a slidable sleeve 48. The sleeve 48, is slidable between the cutter sleeve 45 and the shaper sleeve 43. Normally the slidable sleeve 48, is held in its lowermost position, as shown in Figure 4, with the lower end thereof flush with the lower end of the stationary cutter sleeve 45. The sleeve 48, is held in its lowermost position by means of a coiled spring 49, which is disposed within a chamber 50, provided in the plate 15. The lower end of the spring 49, seats upon an apertured disk 51, which is slidably mounted within the chamber 50, above a centrally apertured plate 52, which closes the lower end of the chamber 50. Secured to the bottom of the disk 51, are a plurality of vertical rods or guide stems 53, which slidably project through registering passages provided in the plates 29 and 52. The lower ends of the stems 53, seat against the flange 47, of the slidable sleeve 48. The upper end of the spring 49, is seated against a plug 54, which is threaded into the upper threaded end of the chamber 50. Slidable in the shaper sleeve 43, is a chambered plunger or stripper 55, having a coiled spring 56, seated therein. The lower end of the stripper plunger 55, is provided with a peripheral groove forming a boss or tip 57. Secured in the plunger 55, is the threaded end of a supporting guide bolt or rod 58, which projects through the plate 52, and is provided with an integral head. Normally the spring 56, serves to hold the stripper plunger 55, in its lowermost position as shown in Figure 4.

Mounted securely upon the frame top 12, is a table plate 59, the ends of which extend beyond the ends of the adjustable punch plate 15. The table plate 59, is provided with a plurality of discharge passages 60, which register with the passages 13, in the frame top 12. Rigidly secured in the table plate 59, are the lower ends of a plurality of upright guide posts 61, the upper ends of which project into vertical passages or openings formed in the adjustable punch plate 15. Apertured bosses 62, are integrally formed on the under surface of the punch plate 15, through which the guide posts project. Integrally formed on the top of the table plate 59, is a circular hub or boss 63, on which is rotatably mounted a ratchet turntable 64, the periphery of which is provided with a plurality of spaced notches 65. Provided in the upper surface of the turntable 64, are two concentric guide grooves 66 and 67. As shown in Figure 6, the turntable 64, is provided with a plurality of sets of openings 68. The upper end of each opening 68, is slightly enlarged to form a circular groove affording a gasket pocket or seat 69, for receiving partly formed metal gasket rings when they are stripped from the shaping ends 44, of the punch sleeves 43, as will be evident from the disclosure shown in Figure 9. A circular groove 70, is formed in the turntable around each of the openings 68, and around the gasket seat 69, thereof. Adjustable in the groove 70, is a ring 71, having springs 72, therebelow. Screws 73, are provided in the turntable for limiting the upward movement of the ring 71, by the springs 72.

Secured longitudinally upon the table plate 59, and diametrically over the turntable 64, is a die plate 74, through the sides of which the turntable 64, is permitted to project. The die plate 74, is cut away at 75, to permit the die plate to engage over the turntable 64 and the hub 63 of the plate 59. The die plate 74, is provided with openings 76 and 77, at one end to receive the punches 21 and 22 respectively. Provided in the opposite end of the die plate 74, are groups of openings 78 and 79. A die ring 80, is engaged in the upper end of each of the die plate openings 76, to co-act with the lower cutting edge of one of the primary punches 21. Die rings 81, are engaged in the upper ends of the die plate openings 77, for co-action with the lower ends of the punches 22. Rigidly secured transversely across the top of the middle portion of the die plate 74, is a T-iron or upright web 82, adapted to serve as a partition between the two kinds of material fed into the machine. Rigidly secured across the top of the die plate 74, and on opposite sides of the web 82, are cutters or blades 83, adapted to co-act with the cutters 18, for cutting off the inner waste ends of the materials fed into the machine. Rigidly secured in the upper ends of the die plate openings 78, are upwardly projecting die sleeves 84. Die sleeves 85, are secured in the upper ends of the die plate openings 79, and project upwardly. Mounted upon the top of one end of the die plate 74, is a guide hood or plate 86, provided with openings 87 and 88, to permit the punches 21 and 22, respectively to pass downwardly therethrough. The hood 86, terminates at the cutter 83, at that end of the die plate, and affords a passage 89, through which a strip or sheet of asbestos may be fed into the machine. Mounted on top of the other end of the die plate 74, is an adjustable spring supported stripper plate 90, provided with guide channels 91, to permit a strip of metal 92, to be fed into the machine. The stripper plate 90, is provided with groups of openings to permit the die sleeves 84 and 85 to project through the stripper plate.

Secured to one side of the inner end of the die plate 74, as shown in Figures 6 and 12, are two gasket strippers or gasket removing fingers 93, the free ends of which track in the turntable grooves 66 and 67.

Secured on the frame 1, at the front edge of the plate 59, is a guide block 94, provided with a longitudinal guide groove or slot 95, in which a shoe 96, is slidably mounted. Pivotally mounted on the shoe 96, is a pawl 97, which is held in engagement with the periphery of the turntable 64, by means of a spring 98, carried by said shoe. A pair of apertured upright lugs 99, are formed on each end of the shoe 96. Pivotally connected with two of said lugs 99, is one end of a connecting rod or bar 100, the other end of which is pivotally connected to a crank arm 101, secured on the front end of the driving shaft 11. A material feed mechanism is mounted on each end of the plate 59, and both of said feed mechanisms are substantially the same in construction. Secured on the rear end of the shaft 11, near the lever 10, is a crank 102, to the end of which is pivotally connected one end of a link 103. The other end of the link 103, has a guide bolt 104, journalled therein for slidable engagement with a T-slotted crank 105. Mounted on each end of the plate 59, is a block 106, having a material guide apron 107 secured thereto. Journalled in the block 106, is a lower feed roller shaft 108, having a gear 109 secured on one end thereof and a ratchet wheel 110 on the other end. Mounted on the inner surface of the slotted crank 105, is a pawl 111, to co-act with the ratchet wheel 110. A pair of upright posts 112, are mounted upon the top of the block 106, and engaged around said posts are springs 113, for adjustably holding an apertured yoke 114, against the top of the block 106. Journalled in the yoke 114, is the shaft 115, of an upper feed roller 116. Secured on one end of the roller shaft 115, is a gear 117, which is adapted to mesh with the gear 109. Fulcrumed near each end of the lower roller shaft 108, is a two armed rocker 118, one arm of which engages under the yoke 114, while the other end is positioned to be engaged by an adjustable screw 119, engaged through a lug 120, integrally formed at the corner of the punch plate 15. Pivotally connected to two of the lugs 99, of the slidable shoe 96, is one end of a connecting rod or bar 121, the other end of which supports the guide bolt 104, at the metal feeding end of the plate 59. As shown in Figure 3, the slotted crank arm 105, for each of the material feed mechanisms is pivoted on one end of the respective lower roller shaft 108, adjacent the ratchet wheel 110.

As shown in Figures 17 and 18, each of the gaskets formed by the machine embraces a tubular metal ring 123, enclosing a core ring of asbestos 124.

The operation is as follows:

The machine is adapted to make metal gasket rings having asbestos core rings therein. The machine is operated by means of a belt or other suitable means engaged with the fly wheel 6, to rotate the same. Rotation of the fly wheel 6, causes rotation of the crank shaft 3, and the slotted crank 7, engaged thereon. The connecting rod 9, is thus reciprocated and acts to swing the lever 10, back and forth as indicated in dotted lines in Figure 7. The driving shaft 11, is thereby alternately rotated a partial turn in opposite directions, at the same time causing the crank arms 101 and 102 to rock back and forth.

The movement of the crank 101, serves to reciprocate the shoe 96, in the guide block 94, and said shoe in turn acts to operate the connecting rod 121, to cause operation of the metal feeding mechanism. The movement of the crank arm 102, acts to operate the link 103, which operates the asbestos feeding mechanism of the machine. A sheet of asbestos is guided under the apron 107, at one side of the machine into the groove 89, afforded by the material guide 86. At the same time a sheet of metal 92, is guided between the guide channels 91, of the stripper plate 90. The strip of asbestos and the strip of metal 92, are adapted to be passed between their respective upper and lower feed rollers at the sides of the machine. Each swing of the link 103 and the connecting rod 121, causes the respective slotted cranks 105, to operate and cause a partial rotation of the lower roller shafts 108, and the rollers thereon. The gears 109, on the lower roller shafts 108, being in mesh with the upper gears 117, cause rotation of the upper rollers 116, in a direction opposite to that of the lower rollers. It will thus be seen that the asbestos and the metal are automatically fed into the machine from opposite directions. With each swing of the cranks 105, the pawls 111, thereon act to engage and rotate the ratchet wheels 110, to cause operation of the lower roller shafts 108.

Movement of the crank arm 101, also serves to reciprocate the shoe 96, the pawl 97, of which engages in one of the turntable notches 65, and acts to partially rotate the turntable 64. Upon the return movement of the shoe 96, the pawl 97, swings outwardly against the action of its spring 98, and slides on the periphery of the turntable into a position wherein the pawl is permitted to engage in the next turntable notch.

Rotation of the crank shaft 3, also serves to reciprocate the punch shaft 4, to cause the punch mechanism carried by the punch plate 15, to co-act with the die mechanisms supported by the die plate 74. In the uppermost or normal position of the punch plate 15, the punches 21, 22 and 31, and the cutter sleeve 45, are all sufficiently elevated to permit the asbestos and the sheet metal to be fed into the machine by the feed rollers. In the first step of the feeding of the materials into the machine the metal strip is moved to be positioned below the punches 31, and the asbestos sheet has the end portion positioned below the primary punches 21. As the punch shaft 4, descends, the punch plate 15, and the respective punches are moved downwardly into the intermediate position shown in Figure 4. This operation causes the punches 21, to co-act with the dies 80, to punch out circular disks of the asbestos. The asbestos disks are discharged through the openings 76, 60 and 13. The lower edges of the punches 21 and the upper inner edges of the dies 80, act as cutters for punching the asbestos.

With the further downward movement of the punch plate 15, into the position shown in Figure 5, the primary metal punches 31, act to punch out metal disks which fall downwardly out of the machine through the openings 79, 60 and 13. As the punches 31, act to punch out disks, the dies 85, engage the margins of the holes in the metal strip and bend said margins upwardly to form inner gasket rims 125, as shown in Figure 10. The downward movement of the punch plate causes the retraction of the slidable sleeves 32, against the action of the springs 36, to permit forming of the gasket rims 125. With the return or upward movement of the punch plate 15, the spring impelled sleeves 32, act to push the gasket rims out of the sleeves 34.

During the next descent of the punch plate 15, the asbestos and the metal strips are advanced by the feed rollers, to advance the asbestos sheet so that the holes punched therein by the puncher 21, are now positioned below the punches 22. The metal sheet is simultaneously advanced to position the partly formed gasket rims 125, under the cutter punches 45. The second descent of the punch plate now causes the punches 22, to co-act with the dies 81, to punch out asbestos rings, while the cutter punches 45, co-act with the die sleeves 84, to cut out gasket rings and turn up the outer margin thereof to form gasket channel rings, as shown in Figure 9. With the ascent of the punch plate 15, the gasket channel rings are stripped from the forming edges 44, of the sleeves 43, by means of the strippers 55, and an inner edge of said die sleeves 84. The channel gasket rings are thus permitted to drop into the gasket seats 69, of the turntable 64, and be carried around to the other side of the machine to be filled in turn with the asbestos rings punched out by the secondary punches 22, as shown in Figure 14.

Each descent and ascent of the punch mechanisms accomplishes a step in the automatic forming of the gaskets, and the turntable acts to carry the partly formed metal gasket channel rings into position to be filled with the punched out asbestos rings. After the gasket channel rings are filled with the asbestos core rings 124, the turntable 64, operates to carry the partly completed gaskets into the finishing position at the front central portion of the machine for engagement by the finishing punches 25. With the descent of the punch plate 15, the punches 25, descend so that the grooves 27, thereof will act to curl the upturned metal flanges of the partly formed gaskets, inwardly toward each other around the asbestos core rings, as shown in Figure 16. The rings 71, in the turntable 64, are depressed against the action of their springs 72, when the finishing punches 25, descend to finish the gaskets. As the punch plate 15, now moves upwardly the springs 72, act to automatically elevate the rings 71, which serve to lift the finished gaskets into a position on the turntable so that with the further rotation of said turntable the finished gaskets are moved into position to be engaged by the strippers or removing fingers 93, the points of which sliding in the turntable grooves 66 and 67, act to engage under the finished gaskets 123, and automatically lift the same out of the turntable pockets or seats 69, for removal from the machine.

As the asbestos sheet and the metal strip are advanced inwardly toward the web 82, after the asbestos core rings 124, and the metal gasket 123, have been punched therefrom, the waste ends of said asbestos sheet and said metal strip are automatically cut off by the cutter blades 18 and 83, with each descent of the punch plate 15. The cut off or waste ends of the materials are manually removed from the opposite sides of the partition web 82. The various operations of the machine may be so regulated that substantially all of the materials fed into the machine and is used in the construction of the gaskets, with the exception of the punched out disks and the remaining screen-like waste strips which are cut off by the cutters 18 and 83.

The rockers 118, are adapted to be actuated by the adjustable screws 119, with each descent of the punch plate 15, to cause the upper roller supporting yokes 114, to be slightly elevated against the action of the springs 113, to permit the entering material sheets to be properly centered.

I am aware that numerous details of construction may be varied through a wide range without departing from the principles of this invention, and I therefore do not purpose limiting the patent granted otherwise than necessitated by the scope of the appended claims.

I claim as my invention:—

1. An automatic gasket making machine comprising a die mechanism, a punch mechanism adapted to cooperate therewith, means for operating said punch mechanism to cause the formation of core rings and gasket rings, rotatable means actuable by said operating means to carry the gasket rings into position to be filled by said core rings, and means for shaping said gasket rings to enclose said core rings.

2. An automatic gasket making machine comprising a die mechanism, a punch mechanism adapted to co-act therewith, feeding means for feeding material between said die mechanism and said punch mechanism, means for operating said punch mechanism to cause the punching of core rings and gasket rings from said materials, rotatable means operable by said operating means to carry said gasket rings into position to be filled by said core rings, and means for shaping said gasket rings to enclose said core rings.

3. An automatic gasket making machine comprising a die mechanism, a punch mechanism adapted to co-act therewith, means for feeding materials into the machine from opposite directions to be acted upon by said punch mechanism and said die mechanism, means for operating said punch mechanism to cause punching of core rings and gasket rings from said materials, rotatable means operable by said operating means to carry said gasket rings into position to be filled by said core rings, punch means on said punch mechanism for completing the shaping of said gasket rings completely around said core rings, and means on said die mechanism for automatically removing the completed gaskets from said rotatable means.

4. An automatic gasket making machine comprising a frame, a die mechanism supported thereon, a punch mechanism adjustably supported on said frame above said die mechanism, means for automatically feeding materials into the machine from opposite directions to be acted upon by said punch and die mechanisms, means on said frame for operating said punch mechanism and said feeding means to cause core rings and gasket rings to be punched from said materials, a grooved and apertured turntable forming a part of said die mechanism and operable by said operating means to carry the gasket rings seated in the turntable apertures into position to receive said core rings seated therein, finishing punches forming a part of said punch mechanism for completing the forming of said gasket rings around said core rings to form finished gaskets, spring impelled members mounted in said turntable adapted to automatically raise said gaskets in the turntable apertures, and means slidable in the turntable grooves adapted to remove the completed gaskets from said turntable.

5. An automatic gasket making machine comprising a frame, a die mechanism mounted thereon, a punch mechanism adjustably supported on said frame above said die mechanism, means for automatically feeding materials into said machine, means on said frame for operating said punch mechanism and said feeding means to cause core rings and gasket rings to be punched from said materials, a notched carrying member rotatable in said die mechanism, pawl means actuable by said operating means adapted to engage and rotate said notched carrying member to cause the same to carry said gasket rings into position to receive said core rings seated therein, finishing punches forming a part of said punch mechanism adapted to co-act with said notched carrying member for completing the forming of said gasket rings around said core rings to form finished gaskets, means on said die mechanism adapted to co-act with said notched carrying member to cause removal of the finished gaskets from the machine, and cutters mounted on said punch mechanism and on said die mechanism adapted to cut off the waste ends of said materials.

6. An automatic gasket making machine embracing means for feeding materials into the machine, a punch mechanism, a die mechanism therebelow for co-action therewith for cutting and forming gasket rings and core rings from said materials, pawl and ratchet means for operating said carrying mechanism, and means forming a part of said punch mechanism and said carrying means to complete the shaping of said gasket rings completely around said core rings.

7. A gasket making machine comprising means for punching core rings, means for punching channel rings, means for carrying the channel rings into position to have the core rings seated therein, and means for shaping said channel rings to enclose said core rings.

8. In a gasket making machine, means for forming a channel ring, means for punching out a core ring and seating the same in said channel ring, and a mechanism for shaping said channel ring to enclose said core ring.

9. In a gasket making machine, means for feeding materials into the machine from opposite directions, a partition between the materials fed into the machine, means for punching channel rings from one of the materials, means for punching core rings from the other material and seating the same in said channel rings, cutters on opposite sides of the partition for cutting off the inner waste ends of said materials, and a mechanism for shaping the channel rings around said core rings.

10. In a gasket making machine the combination with a die mechanism, of a punch mechanism adapted to co-act therewith to partially form gaskets, a rotatable gasket forming and carrying member in said die mechanism adapted to co-act with the punch mechanism for completing the forming of said gaskets, said carrying member having grooves therein, and tapered strippers tracking in said grooves for removing said finished gaskets from said carrying member.

11. In a gasket making machine the combination with a die mechanism, of a punch mechanism adapted to co-act therewith for partially forming gaskets, punch and die members forming a part of said punch and die mechanisms adapted to co-act to form core rings, a rotatable gasket forming and carrying means in said die mechanism adapted to carry the partially formed gaskets into position to receive said core rings, and finishing punches on said punch mechanism adapted to co-act with said rotatable forming and carrying means to bend the partly formed gaskets to completely enclose said core rings.

12. In a gasket making machine the combination with a die mechanism, of a punch mechanism, co-acting primary punch and die members on said mechanisms for punching and forming one rim of a gasket, secondary punch and die members on said mechanisms for cutting and forming a second rim of the gasket, punch and die members on said mechanisms for cutting a core ring, a rotatable gasket forming and carrying means in said die mechanism adapted to receive and carry the partially formed gasket into position to receive the core ring seated therein, and finishing punches on said punch mechanism adapted to co-act with said rotatable forming and carrying means to complete the forming of said gasket around the core ring.

13. In a gasket making machine the combination with a die plate, of an adjustable punch plate, co-acting primary punch and die members on said plates for punching a material and forming one rim of a gasket, co-acting secondary punch and die members on said plates for cutting and forming a second rim of the gasket, punch and die mechanisms on said plates for cutting a core ring, a rotatable forming and carrying member in said die plate adapted to receive said partially formed gasket, means for rotating said forming and carrying member to carry the gasket into position to receive the core ring seated therein, finishing punches on said punch plate adapted to co-act with said forming and carrying member to complete the forming of said gasket around said core ring, and means mounted on said die plate adapted to remove the finished gasket from said forming and carrying member.

14. In a gasket making machine the combination with a die plate, of an adjustable punch plate, a mounting table supporting said die plate, a boss formed thereon, co-acting primary punch and die members on said plates for punching a material and forming one rim of a gasket, co-acting secondary punch and die members on said plates for cutting and forming a second rim of the gasket, co-acting punch and die mechanisms on said plates for cutting a gasket core ring, a forming and carrying member rotatably mounted on said table boss for receiving the partially formed gasket, means for rotating said forming and carrying member to carry the gasket into position to receive said core ring seated therein, finishing punches on said punch plate adapted to co-act with said forming and carrying member to complete the forming of said gasket to completely enclose said core ring, spring impelled means in said forming and carrying member for raising the completed gasket, and means on said die plate for automatically removing the completed gasket from said forming and carrying member.

15. In a gasket making machine a die supporting plate, material guides thereon, means for feeding materials into said guides from opposite directions, a punch plate, driving means for operating said feeding means and said punch plate, primary punches and dies on said punch plate and on said die plate adapted to punch one of said materials and form one rim of a gasket, co-acting secondary punches and dies on said plates for cutting and forming a second rim of the gasket, co-acting punch and die mechanisms on said plates for cutting a gasket core ring from another of the materials fed into the machine, a gasket forming and carrying turntable rotatably mounted in said die supporting plate, means for operating the turntable, stripper means associated with said secondary punches and dies to cause the partially formed gasket to drop onto said turntable to be carried into position to receive the core ring seated therein, finishing punches on said punch plate adapted to co-act with the turntable to complete the forming of said gasket to completely enclose the core ring, cutters on said plates for cutting off the waste end of the materials fed into said guides, spring impelled members in said turntable for elevating the finished gasket, and means on said die plate adapted to co-act with the turntable to automatically remove the finished gasket from the turntable.

16. In a gasket making machine, means for punching endless channel rings, and means for bending the margins of said channel rings inwardly towards one another to form closed rings.

17. In a gasket making machine, means for forming an endless channel ring, means for seating a core in said channel ring, and means for shaping the channel ring around said core.

18. In a gasket making machine, a partition, means for feeding materials into the machine on opposite sides of said partition, mechanisms for punching rings from said materials and forming the ring punched from one material around a ring punched from the other material, and cutters on opposite sides of the partition for cutting off the waste ends of said material.

19. In a gasket making machine, the combination with grooved means for holding cored gasket rings, and means adapted to engage in said grooved means to engage beneath said rings to lift the same from said grooved means.

In testimony whereof I have hereunto subscribed my name in the presence of two subscribing witnesses.

EDWARD A. RYBICKI.

Witnesses:
 EARL M. HARDINE,
 FRED E. PAESLER.